L. B. PIERSON.
TIRE TRIMMING TABLE.
APPLICATION FILED APR. 26, 1919.
1,329,849.
Patented Feb. 3, 1920.
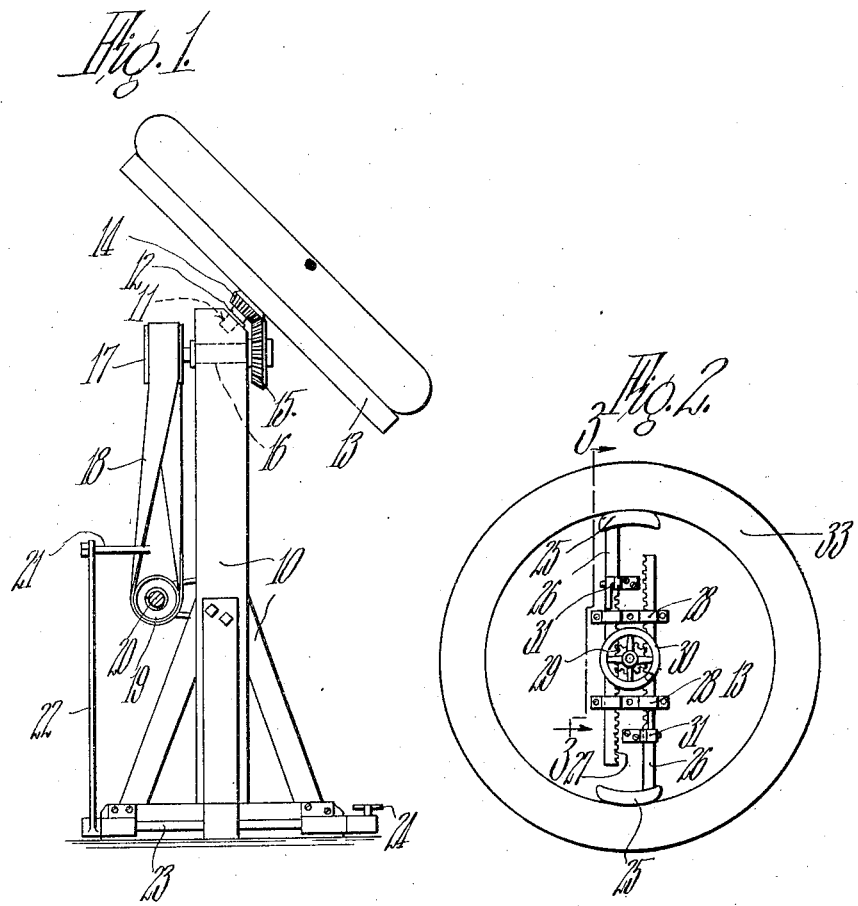
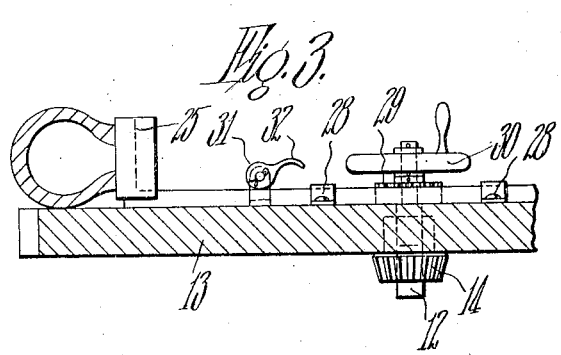
INVENTOR
Louis B. Pierson.
BY Chapin & Neal.
ATTORNEYS.

UNITED STATES PATENT OFFICE.

LOUIS B. PIERSON, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TIRE-TRIMMING TABLE.

1,329,849.                 Specification of Letters Patent.      Patented Feb. 3, 1920.

Application filed April 26, 1919. Serial No. 292,921.

*To all whom it may concern:*

Be it known that I, LOUIS B. PIERSON, a citizen of the United States of America, residing at Chicopee Falls, in the county of Hampden and State of Massachusetts, have invented certain new and useful Improvements in Tire-Trimming Tables, of which the following is a specification.

My invention relates to rotatable tables adapted to support a tire casing while the surplus rubber occurring at the center of the tread and at the inner edges of the beads is being trimmed. It has for its object the provision of a table which will securely grasp the tire so as to present either the beads or the tread for trimming. It also has for its object the provision of a device which will materially reduce the expense of trimming tire casings.

Due to the use of circumferential split molds in the vulcanization of tire casings, a fin of surplus material occurs at the center of the tread of tire casings. There is also a fin of surplus material at the inner edge of each bead. It is necessary before marketing the tires to trim off these fins so that the tire will present a smooth appearance. My invention, which is particularly adapted for use with a tire trimming knife such as is described in my co-pending application, Serial No. 288,723, filed April 9, 1919, will now be described with reference to the accompanying drawings in which,—

Figure 1 is a side elevation of a tire trimming table constructed according to my invention;

Fig. 2 is a face view of the table with a tire in place showing the mechanism for clamping the tire; and Fig. 3 is a section on line 3—3 of Fig. 2 showing details of the clamping mechanism.

The table is mounted on a frame 10 of any suitable construction. The upper end of this frame has a hole 11 which receives a short shaft 12 secured to a rotatable table 13 and having fast thereon a bevel gear 14. This gear meshes with a similar gear 15 on a shaft 16 extending through the frame and having thereon a pulley 17. A belt 18 connects this pulley with tight and loose pulleys 19 on a shaft 20 which may be driven from any suitable source of power. A shipper 21 carried on an arm 22 of a rotatable shaft 23 may be moved to position belt 18 on either the tight or the loose pulley by a double treadle 24.

The clamping mechanism consists of two plates 25 carried on bars 26 which are formed as racks 27 for a portion of their length. Guides 28 serve to maintain the bars in position. Located at the center of the table and between the rack portion of bars 26 is a gear 29 having a hand wheel 30 attached thereto. By rotating this hand wheel, plates 25 may be moved readily either outwardly or inwardly. Clamps 31, which have eccentric body portions and handles 32, are provided to clamp bars 26 solidly against the table 13.

In Fig. 2, plates 25 are shown engaging the inner circumference of a tire casing 33. With the parts in this position, table 13 is rotated by moving the belt 18 so that it runs on the tight pulley. This causes the tire to rotate and the operator can trim off the fin at the center of the tread by means of a knife such as is described in my co-pending application above referred to, or by any other suitable means.

If it is desired to trim the edges of the beads, clamps 31 are released and plates 25 are moved away from the tire casing by turning hand wheel 30. The tire is then removed and the plates 25 moved outwardly by turning hand wheel 30, until the tire can be placed between them. The clamps are then moved together until they firmly clamp the tire by its tread, clamps 31 are closed and the operator may trim the edges of the beads with any suitable cutting means.

I claim—

1. A tire trimming table comprising a frame, a table rotatable therein, means for rotating the table and clamping means carried by the table and constructed and arranged to grasp a tire casing by either the outer or the inner circumference.

2. A tire trimming table comprising a frame, a table rotatable therein and carried at an angle to the horizontal, means for rotating the table and clamping means carried by the table and constructed and arranged to grasp a tire casing by either the outer or the inner circumference.

3. A tire trimming table comprising a frame, a table rotatable therein, means for rotating the table at will, a pair of jaws slidable upon the table and adapted to grasp a tire casing by either the outer or inner circumference, means for moving the jaws, and means for holding the jaws in any desired position.

4. A tire trimming table comprising a frame, a table rotatable therein, means for rotating the table at will, a plurality of bars arranged to slide on said table, gear teeth on a portion of said bars, a gear meshing with the gear teeth and adapted to be rotated so as to move the bars, clamping means to hold the bars in any desired position, and jaws secured to the bars and shaped to fit either the outer or inner circumference of a tire casing.

LOUIS B. PIERSON.